June 15, 1926.
W. H. STRAUTMAN ET AL
1,589,263
ELECTRIC SWITCH
Filed Dec. 10, 1921
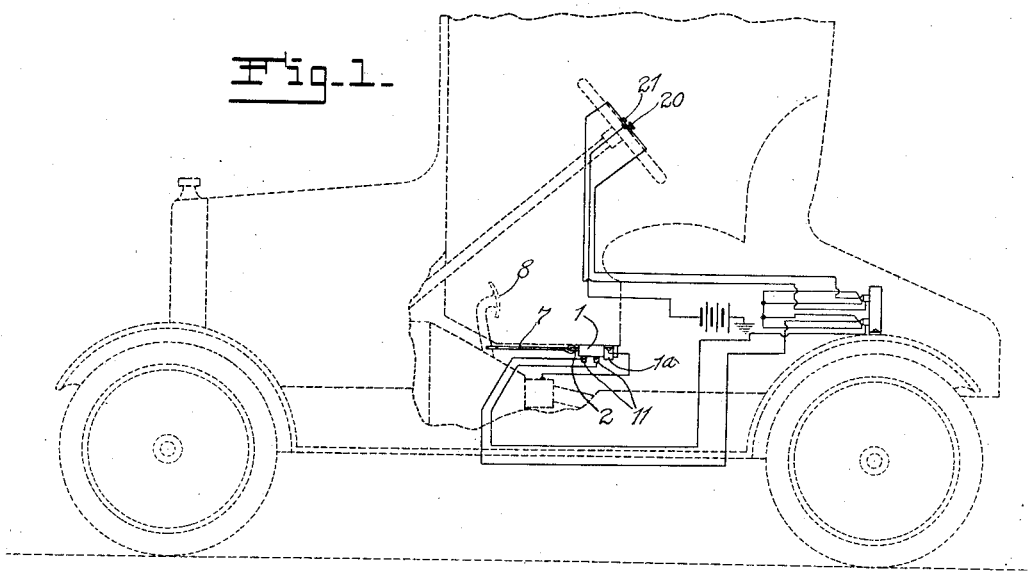
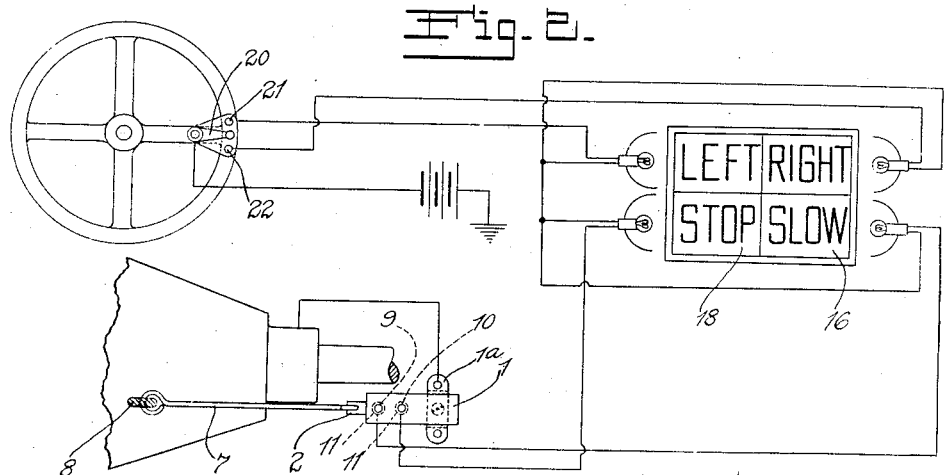
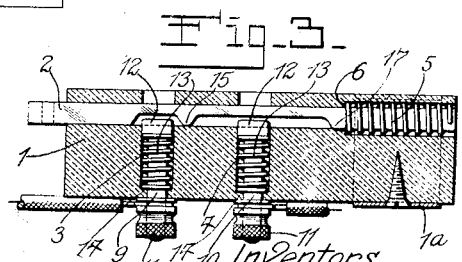
Inventors.
William H. Strautman and Albert Lupberger,
by E. Small & Small
Their Attorneys.

Patented June 15, 1926.

1,589,263

UNITED STATES PATENT OFFICE.

WILLIAM H. STRAUTMAN AND ALBERT LUPBERGER, OF ST. LOUIS, MISSOURI.

ELECTRIC SWITCH.

Application filed December 10, 1921. Serial No. 521,410.

This invention has for its prime object the provision of a box, adapted for attachment upon the rear of an automobile, having a plurality of windows showing the words "Stop", "Slow", "Right" and "Left", and an electrical switch adapted to close and open the light circuit extending to the "Stop" and "Slow" signals upon depression and release of the brake pedal by the person operating the car.

In the accompanying drawing, where like numerals refer to like parts throughout, Figure 1 is a diagrammatic side elevation of a Ford automobile showing the preferred manner of attaching the invention thereto; Figure 2 a partly diagrammatic plan view, on enlarged scale, depicting the electrical wiring, the connections of the aforesaid switch and the additional manually-operated switch on the steering-wheel for control of the "Right" and "Left" signals; and Figure 3 a longitudinal sectional view showing the construction of the brake-operated switch.

The switch, as best shown in Figure 5, comprises an oblong block 1 of hard rubber or vulcanized fibre slotted longitudinally for the reception of a bar 2 which block is provided with recesses 3—4 and the bar is yieldingly retained against forward movement by a helical spring 5 mounted thereon, said spring bearing against the shoulder 6. The forward extremity of said bar is connected by rod 7 with the foot-brake lever 8, and said block is preferably secured to the under surface of the floor of the vehicle by a bracket 1ª.

Binding posts 9—10 threaded for retention of nuts 11 are projected through said block and terminate in metal caps 12 which extend within recesses 3—4 during non-use of lever 8 and serve to compress springs 13 against shoulders 14. When said lever is depressed to a slight extent for the purpose of merely checking the speed of the car, rib 15 dividing said recesses contacts with the cap of post 9 and thus effects immediate illumination of the window 16 displaying the word "Slow" by closing the circuit supplying the lamp at the rear thereof. When said lever is still further depressed in order to stop the car, rib 15 rides off the cap of post 9 and the rear portion of bar 2, defined by shoulder 17, is brought into contact with the cap of post 10, thus closing the circuit supplying the lamp which illuminates the window 18 displaying the word "Stop."

By reference particularly to Figure 4 it will be noted that the signal box is divided into four (4) compartments of equal size corresponding to and located behind the four (4) etched windows, and that the lamp of each compartment is enclosed on all sides by inclined reflectors 19 (three thereof being shown) which serve to intensify the illumination of the respective signals.

The words "Right" and "Left", indicating the direction in which the vehicle is to be turned, are illuminated by manual movement of lever 20 attached to a spider of the steering-wheel or, if preferred, to the steering-post, thus engaging the electrical terminals 21 or 22, as desired, and closing the circuit extending to the proper window of the signal box.

What we claim as new and desire to secure by Letters Patent is:—

1. A switch comprising a block of insulation material, said block having a longitudinal slot and a transverse slot, switch elements slidable in said slots, individual spring means for urging each of said switch elements in one direction, and means for moving said switch elements in the opposite direction.

2. A switch comprising an insulation block, said block having slots therein, a plurality of spring pressed contacts slidable in certain of said slots, and a spring pressed bar slidable in another of said slots and having means for successively engaging individual contacts.

3. A switch comprising an insulation block, said block having a longitudinal slot and a plurality of transverse slots, a spring pressed contact slidable in each of said transverse slots, and a contact bar slidable in said longitudinal slot and having means for successively engaging individual contacts in said transverse slots.

4. A switch comprising an insulation block having a plurality of transverse slots and a longitudinal slot, a spring pressed contact member slidable in each of said transverse slots, and a contact bar slidable in said longitudinal slot, said contact bar having a plurality of recesses into which said contact members individually extend when the bar does not engage said members, and having means for engaging said contact members.

5. A switch comprising a plurality of spaced spring pressed contact members and a bar for selectively engaging said members, said bar having a plurality of recesses into which said contact members extend when the bar does not engage them and a rib between said recesses for engaging one of said contact members while another of said contact members is out of engagement with the bar.

WILLIAM H. STRAUTMAN.
ALBERT LUPBERGER.